Patented May 20, 1941

2,242,372

UNITED STATES PATENT OFFICE 2,242,372

METHOD OF MAKING POROUS ARTICLES

George Schneider, Montclair, N. J., assignor to Celanese Corporation of America, a corporation of Delaware No Drawing. Application July 26, 1938, Serial No. 221,361

10 Claims. (Cl. 18—48)

This invention relates to the production of porous articles suitable for use as insulating material, filters for gases and liquids, sponges, etc. from organic derivatives of cellulose.

An object of the invention is the economic production of porous articles from organic derivatives of cellulose. Another object of the invention is the production of sponge-like articles that are insoluble in water and not affected by dilute inorganic acids and organic acids, dilute alcohols and the like. A still further object of the invention is the production of artificial sponge-like material that is very absorbent.

Sponge-like or rigid porous materials have been made from organic derivatives of cellulose, as described in my prior U. S. Patent No. 2,085,047, and from organic esters of cellulose that have been partially to completely saponified, as described in U. S. Patent No. 2,085,052 to W. I. Taylor. I have now found a more economical way of producing good artificial sponges or more rigid articles such as filters and insulating material.

Articles formed in accordance with this invention may have any desired degree of porosity and rigidity. The articles may be sponge-like and very absorbent or they may be more rigid, having a rigidity similar to cork. The articles may be formed with large pockets, canals and ducts similar to either fine or coarse natural sponges or they may contain ducts with relatively thick walls similar in appearance to Swiss cheese. The rigidity may be controlled in such a manner as to produce articles that may be squeezed and bunched up like natural sponges or they may be produced in any rigidity up to that of hard or almost glass-like materials. The rigidity of the article is controlled for the most part by the use of filling materials and the degree to which the article is saponified.

In accordance with my invention, I produce porous articles containing organic derivatives of cellulose as the main constituent of the skeleton or walls of the porous article. The articles are produced by dissolving cellulose derivatives, under the action of heat and pressure, in a liquid comprising a highly volatile substance which is a solvent for the organic derivative of cellulose and a substance which at normal temperatures and pressures, and especially in the absence of the volatile substance, is not a solvent for the derivative of cellulose but is preferably a precipitating liquid. The derivative of cellulose is dissolved in the liquid under the action of heat and pressure, the pressure being then quickly released causing the volatile liquid to volatilize and expand forming pockets, holes, ducts, etc. in the derivative of cellulose. For the production of sponges this porous article may then be partially or totally saponified.

Any type of filler may be used. For instance, in the manufacture of sponges it is preferable to add as a filler or a binding agent a fibrous absorbent material, such as cotton or linen waste, whereby the tearing of the sponge is prevented. In the production of insulating material it is preferable to add fire retardants and stiffening materials such as ground glass, Fuller's earth, etc. Other effect materials may be added such as plasticizers, dyes, lakes, fire retardants, etc. to produce articles of any desired characteristics.

This invention is applicable to the production of porous articles of any suitable organic derivative of cellulose, such as the organic esters of cellulose and cellulose ethers. Examples of the organic esters of cellulose are cellulose acetate, cellulose formate, cellulose propionate and cellulose butyrate, while examples of the ethers of cellulose are ethyl cellulose, methyl cellulose and benzyl cellulose.

The porous materials produced in accordance with this invention have a wide variety of uses and by a selection of the base material may be made so that they are unaffected by solvents and cleaning fluids employed in various industries. Furthermore, the articles may be molded into any desired shape such as matts, bars, sheets, etc. For instance, springy, sponge-like, highly porous articles may be formed into cakes or bars as a substitute for natural sponges. These artificial sponges may contain filling materials such as cotton or linen waste or threads or fibers of regenerated cellulose or scrap, fabric, etc., to increase their resistance to tearing, yet without affecting their absorbent properties.

These materials may also be made in the form of discs, matts, wads and the like for use as filters for filtering liquids or gases. These articles when manufactured for filtering purposes may contain fillers such as glass wool, spun rock, asbestos and the like. The material may also be formed into the form of slabs, sheets and the like containing fillers of cork, diatomaceous earth, mica, sawdust, etc. These slabs and sheets may be used as insulating materials in refrigerators, aeroplanes, automobiles, houses, etc. since they have the advantage of being light in weight, inert to atmospheric changes and not affected by fungus or mold growth.

The material is made porous by dissolving the same in a suitable liquid which preferably contains a highly volatile solvent for the organic derivative of cellulose and a precipitating liquid, for example, a liquid containing 60 parts by weight of water and 30 parts by weight of acetone. This liquid normally has little or no effect on cellulose acetate but under pressure of about 75 pounds per square inch and a temperature of 65° C. cellulose acetate may be dissolved therein. To make highly porous articles the pressure is quickly released while to make less porous articles the pressure is released more slowly. This may be accomplished by placing a desired quantity of cellulose acetate and liquid in an autoclave and raising the temperature and pressure to the desired amounts by air pressure pumped into the autoclave above the material. Upon quickly releasing the air pressure the material which has been in solution expands and puffs up to a porous mass. An alternative method of making the articles is to place the same in the bottom of a cylinder having a piston therein and provided with means for heating the same. Suitable pressure is obtained by the use of the piston and release of pressure is effected by withdrawal of the piston. Still another method of forming articles, and oftentimes preferred, is to place the cellulose acetate and liquid in a sealed container having a valve at the bottom and an air line at the top thereof and provided with means for heating the same. Air is supplied through the top of the container to build up the desired pressure on the material and effect a solution thereof, and while maintaining the pressure on the container constant the valve at the bottom is opened allowing the material to be extruded into the atmosphere or into a receptacle under sub-atmospheric pressure, in which case there is almost an instantaneous release of pressure and a very fluffy porous mass produced. If desired, a circular or square tube may be placed over the valve such that the extruded puffed-up material is shaped to a cylinder or bar which may later be cut to suitable lengths.

In the production of sponges, articles made by any of the above methods, especially when the base material is cellulose acetate or other organic ester of cellulose, may be saponified or partially saponified by soaking the same for several hours in ammonia water, or a solution of caustic soda or quaternary amine. This produces an article of regenerated cellulose having good absorbent properties.

As stated above, the liquid in which the organic derivative of cellulose is dissolved by the aid of heat and pressure may be any liquid mixture containing a volatile solvent and a precipitating liquid. The mixture most preferred when employing cellulose acetate is one of acetone and water. Any solvent or solvent mixture may be employed such as, for example, chloroform, mixtures of acetone and methyl and ethyl alcohol, ethylene dichloride, mixtures of ethylene dichloride and ethyl or methyl alcohol, diacetone, etc. The precipitating liquid for the water-insoluble organic derivative of cellulose is preferably water for economic reasons. However, other precipitating liquids may be employed such as kerosene and other like hydrocarbons, naphtha, etc. Obviously the concentration of the solvent in the precipitating liquid will depend upon the solubility characteristics of the organic derivative of cellulose employed in the particular solvent employed. The concentration of the solvent in the liquid should be below that which has an active solvent action on the organic derivative of cellulose at normal temperatures and atmospheric pressure. In any case, the liquid mixture should not have more than a softening or swelling action on the organic derivative of cellulose at atmospheric pressure and room temperature.

Prior to fusion or dissolving under heat and pressure, the organic derivative of cellulose may be soaked in an excess of the solvent/precipitant mixture to induce swelling. However, the material should be fairly well drained prior to the application of heat and pressure as with higher ratios of liquid to organic derivative of cellulose fusion is slower and the resulting product is less porous.

When forming articles of cellulose acetate employing a water/acetone liquid the minimum pressure for fusion is found to be between 60 and 70 pounds. A higher pressure, e. g. 100 pounds, effects a more complete fusion and results in an article having greater porosity. The minimum time of fusion is about one hour. With cotton waste present as a binder the time required may be somewhat longer. The liquid giving the best results contains from 35 to 45% of acetone and 65 to 55% of water. Where the liquid contains less than 35% of acetone fusion is difficult, while with an acetone content of above 45% products are more dense with diminished porosity.

As an illustration of my invention, but without being limited thereto, the following example is given:

*Example*

100 parts of waste yarn of cellulose acetate having an acetyl value of about 54.5 is soaked in a mixture of 35 parts of acetone and 65 parts of water until the yarn is slightly swollen. The liquid is then drained from the yarn until about 275 parts of liquid remain on the 100 parts of cellulose acetate. This is then subjected to a pressure of about 95 pounds and a temperature of about 75° C. for 3 hours. The pressure is then quickly released producing a puffed up mass of cellulose acetate having the texture of coarse natural sponge. Cakes of this material are then subjected to saponification by soaking the same in a 40% solution of trimethyl benzyl ammonium hydroxide for 1 hour at or near the boiling point. The cakes are then squeezed substantially free of the liquid and the saponifying liquid completely removed by several dippings of the cakes in water, the water being squeezed out after each dipping. The product has the appearance of natural sponge and is very absorbent.

It is to be understood that the foregoing detailed description is merely given by way of illustration and that many variations may be made therein without departing from the spirit of my invention.

Having described my invention, what I desire to secure by Letters Patent is:

1. Method of making porous articles, which comprises dissolving an organic derivative of cellulose with the aid of heat and pressure in a liquid containing an active volatile solvent and a liquid precipitating agent in such proportions that under atmospheric temperature and pressure the said liquid has substantially no solvent action on said organic derivative of cellulose, and quickly releasing the pressure from a substantial mass of the solution.

2. Method of making porous articles, which comprises dissolving cellulose acetate with the aid of heat and pressure in a liquid containing an active volatile solvent and a liquid precipitating agent in such proportions that under atmospheric temperature and pressure the said liquid has substantially no solvent action on said cellulose acetate, and quickly releasing the pressure from a substantial mass of the solution.

3. Method of making porous articles, which comprises dissolving cellulose acetate by subjecting the same to heat and a pressure above 60 pounds per square inch in a liquid containing an active volatile solvent and a liquid precipitating agent in such proportions that under atmospheric temperature and pressure the said liquid has substantially no solvent action on said cellulose acetate, and quickly releasing the pressure from a substantial mass of the solution.

4. Method of making porous articles, which comprises dissolving cellulose acetate by subjecting the same to a temperature above 50° C. and a pressure above 60 pounds per square inch in a liquid containing an active volatile solvent and a liquid precipitating agent in such proportions that under atmospheric temperature and pressure the said liquid has substantially no solvent action on said cellulose acetate, and quickly releasing the pressure from a substantial mass of the solution.

5. Method of making porous articles, which comprises dissolving cellulose acetate with the aid of heat and pressure in a liquid containing an active volatile solvent and a liquid precipitating agent in such proportions that under atmospheric temperature and pressure the said liquid has substantially no solvent action on said cellulose acetate, and extruding a substantial mass of the solution into the atmosphere.

6. Method of making porous articles, which comprises dissolving cellulose acetate by subjecting the same to heat and a pressure above 60 pounds per square inch in a liquid containing an active volatile solvent and a liquid precipitating agent in such proportions that under atmospheric temperature and pressure the said liquid has substantially no solvent action on said cellulose acetate, and extruding a substantial mass of the solution into the atmosphere.

7. Method of making porous articles, which comprises dissolving an organic derivative of cellulose with the aid of heat and pressure in a liquid containing an active volatile solvent and a liquid precipitating agent in such proportions that under atmospheric temperature and pressure the said liquid has substantially no solvent action on said organic derivative of cellulose, quickly releasing the pressure from a substantial mass of the solution and converting at least part of the organic derivative of cellulose in the resulting porous mass to cellulose.

8. Method of making porous articles, which comprises dissolving cellulose acetate with the aid of heat and pressure in a liquid containing an active volatile solvent and a liquid precipitating agent in such proportions that under atmospheric temperature and pressure the said liquid has substantially no solvent action on said cellulose acetate, quickly releasing the pressure from a substantial mass of the solution and at least partially saponifying the cellulose acetate in the resulting porous mass.

9. Method of making porous articles, which comprises dissolving cellulose acetate by subjecting the same to a pressure of 75 pounds per square inch and a temperature of 65° C. in a liquid containing 60 parts by weight of water and 30 parts by weight of acetone, and quickly releasing the pressure from a substantial mass of the solution.

10. Method of making porous articles, which comprises dissolving cellulose acetate by subjecting the same to a pressure of 75 pounds per square inch and a temperature of 65° C. in a liquid containing 60 parts by weight of water and 30 parts by weight of acetone, and extruding a substantial mass of the solution into the atmosphere.

GEORGE SCHNEIDER.